United States Patent
Nachbur et al.

[15] 3,671,611
[45] June 20, 1972

[54] PHOSPHORUS ACID ESTERS

[72] Inventors: Hermann Nachbur, Dornach; Arthur Maeder, Therwil, both of Switzerland

[73] Assignee: Ciba Limited

[22] Filed: Dec. 23, 1969

[21] Appl. No.: 887,729

[30] Foreign Application Priority Data

Jan. 7, 1969 Switzerland ..............................124/69
July 8, 1969 Switzerland ..........................10370/69

[52] U.S. Cl..............................260/932, 117/139.4, 252/8.1, 260/968, 260/984, 260/DIG. 24

[51] Int. Cl. .............................................................C07f 9/40

[58] Field of Search...................................................260/932

[56] References Cited

UNITED STATES PATENTS 3,401,214  9/1968  Kohler...................................260/932

*Primary Examiner*—Joseph Rebold
*Assistant Examiner*—Richard L. Raymond
*Attorney*—Harry Goldsmith, Joseph G. Kolodny and Mario A. Monaco

[57] ABSTRACT

Phosphorus compounds are provided which correspond to the formula

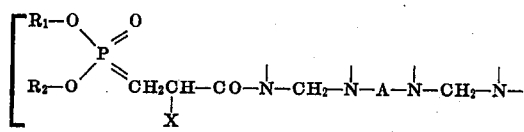

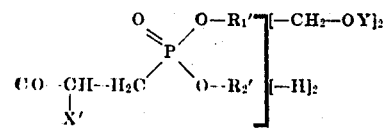

in which each R is an alkyl, alkenyl or halogenalkyl radical, X and X' each is a methyl group or a hydrogen atom, A is a —C-O—, —CS—, —SO$_2$—, —CNH— or —CO—NE—CO— radical, wherein E is a hydrogen atom or a Y—CH$_2$—O— radical and wherein Y is an alkyl radical or a hydrogen atom. The phosphorus compounds are manufactured from the corresponding phosphorus carboxylic acid amides, a diamide and formaldehyde. These compounds optionally together with a curable aminoplast precondensate are useful for flameproofing and creaseproofing of cellulose-containing fiber materials.

14 Claims, No Drawings

PHOSPHORUS ACID ESTERS

The subject of the invention are phosphorus compounds of formula (1)
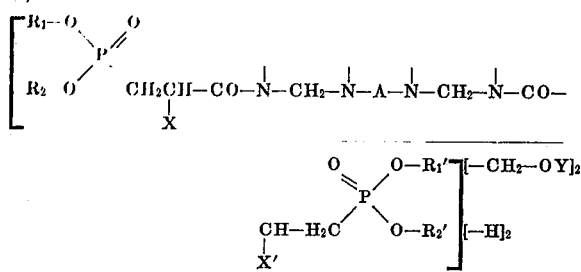

wherein $R_1$, $R_2$, $R'_1$ and $R'_2$ each denote an alkyl, alkenyl or halogenalkyl residue with at most four carbon atoms, X and X' each denote a methyl residue or preferably a hydrogen atom, and A denotes a residue of formula —CO—, —CS—, —SO$_2$—, —CNH— or —CO—NE—CO—, wherein E denotes a hydrogen atom or a residue of formula —CH$_2$—O—Y and wherein Y denotes an alkyl residue with at most four carbon atoms or preferably a hydrogen atom.

Phosphorus compounds which are very suitable are symmetrical and correspond to the formula (2)
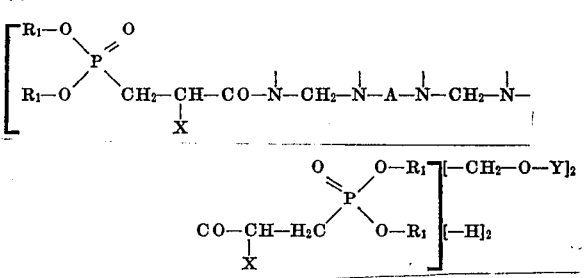

wherein $R_1$, A, X and Y have the indicated significance.

Particular interest above all attaches to phosphorus compounds of formula (3)
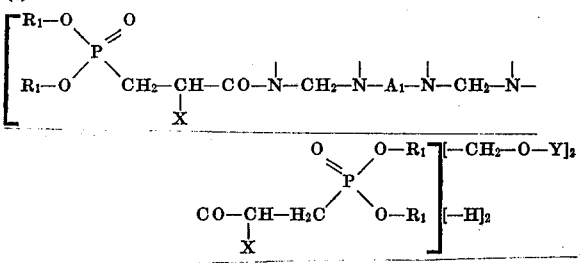

wherein $R_1$, X and Y have the indicated significance and $A_1$ represents a residue of formula —CO—, —CS— or —SO$_2$—.

Preferred phosphorus compounds correspond to the formula (4)
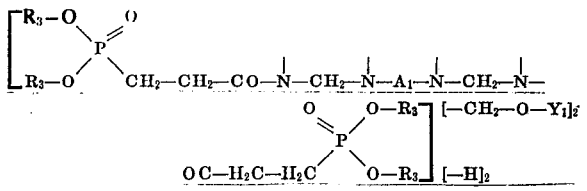

wherein $R_3$ denotes a methyl or ethyl residue, $A_1$ a residue of formula —CO—, —CS— or —SO$_2$— and $Y_1$ a methyl residue or preferably a hydrogen atom.

Amongst the compounds of formula (1), compounds of formula (5)
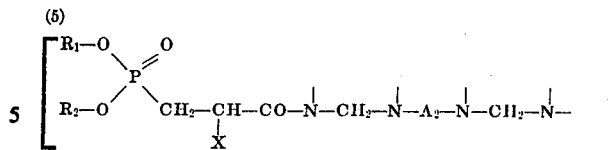
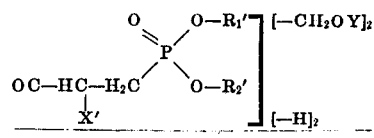

and especially of formula (6)
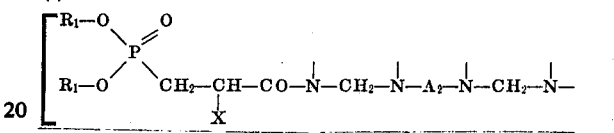
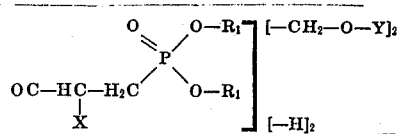

wherein $A_2$ denotes a residue of formula —CO—, —CS—, —CNH— or —CO—NE—CO—, wherein E represents a hydrogen atom or a residue of formula —CH$_2$—O—Y, and wherein $R_1$, $R_2$, $R'_1$, $R'_2$, X, X' and Y have the indicated significance, should also be highlighted.

Compounds of formula (7)
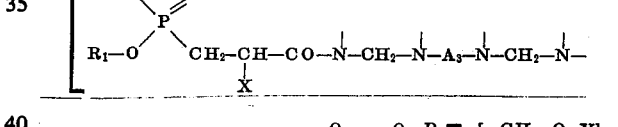

wherein $R_1$, X and Y have the indicated significance and $A_3$ represents a residue of formula —CO— or —CS—, are particularly advantageous.

Amongst these compounds, phosphorous compounds of formula (8)
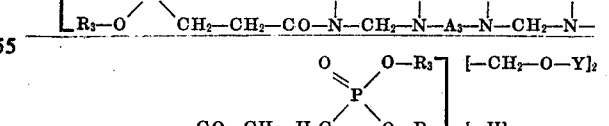

wherein $R_3$ and $A_3$ have the indicated significance and $Y_1$ denotes a methyl group or preferably a hydrogen atom, are in turn particularly preferred.

Phosphorus compounds of formula (9)
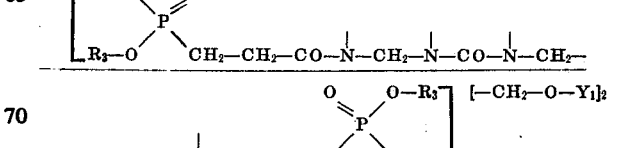

wherein $R_3$ and $Y_1$ have the indicated significance, have proved particularly suitable, as for example the compound of formula

(10)
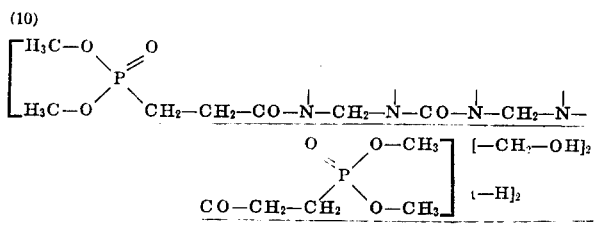

Other suitable phosphorus compounds of formula (1) correspond to the formula

(11)
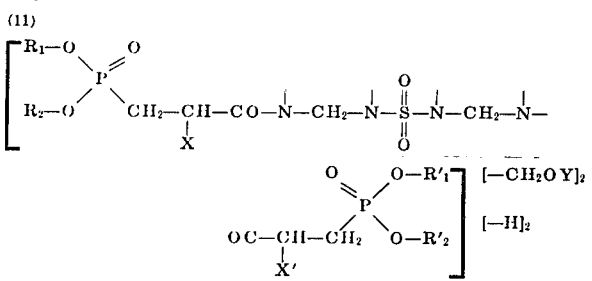

wherein $R_1$, $R_2$, $R'_1$, $R'_2$, X and X' and Y have the indicated significance.

Here, phosphonopropionic acid amides of formula

(12)
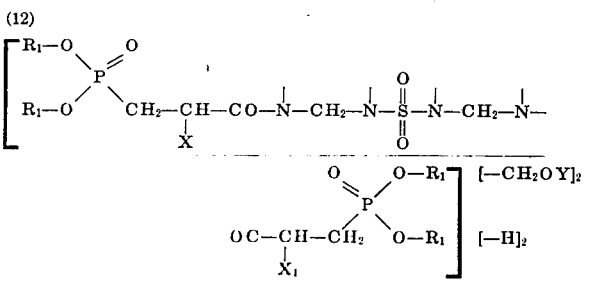

wherein $R_1$, $X_1$ and Y have the indicated significance, are preferred.

Phosphonopropionic acid amides of formula

(13)
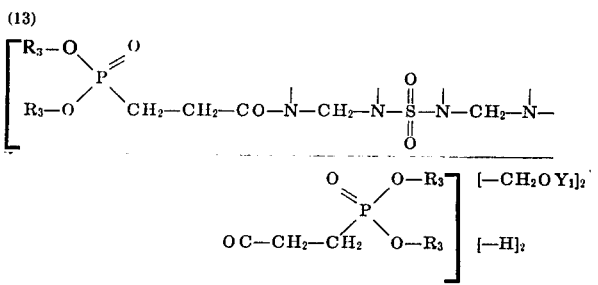

wherein $R_3$ and $Y_1$ have the indicated significance, are also particularly suitable.

Very particular interest attaches to phosphonopropionic acid amides of formula

(14)
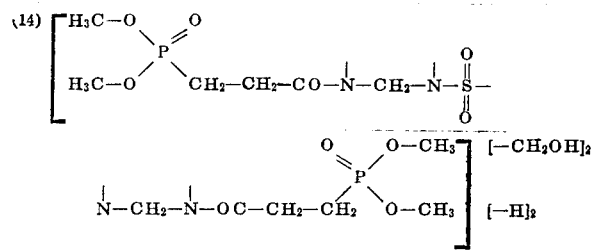

In formula (1), (5) and (11) $R_1$, $R_2$, $R'_1$ and $R'_2$ can thus all be identical, partly identical with one another or all mutually different. Preferably, $R_1$ and $R_2$ and/or $R'_1$ and $R'_2$ denote two identical residues of the indicated composition. As examples, n-propyl, isopropyl, ethyl, methyl, allyl or chloralkyl groups, such as 2-chloroethyl or 2,3-dichloropropyl groups, may be mentioned.

In formulae (1) to (7), (11) and (12) Y can represent an n-butyl, ethyl or methyl group. However, phosphorus compounds wherein Y and/or $Y_1$ denotes a methyl group or especially a hydrogen atom should be highlighted.

The phosphorus compounds of formulae (1) to (14) are appropriately manufactured by reacting (a) 1 mol of a condensation product of (a') 2 mols of at least one compound of formula

(15)
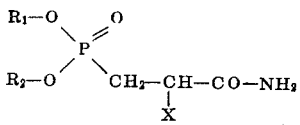

wherein $R_1$, $R_2$ and X have the indicated significance and (b') 1 mol of a compound of formula

(16) $H_2N — A' — NH_2$ wherein A' denotes a residue of formula —CO—, —CS—, —SO$_2$—, —CNH— or —CO—NH—CO—, wherein the $H_2N$ groups of the components (a') or (b') are monomethylolated and optionally etherified, with (b) 2 to 3 mols of formaldehyde or of a formaldehyde-releasing agent at elevated temperature, optionally in the presence of a basic catalyst, and (c) optionally further etherified with 1 to 3 mols of an alkanol with at most four carbon atoms. Alkanols with one to four carbon atoms can especially be used for etherifying the condensation product (a), but preferably the condensation product (a) is used in the unetherified form.

Preferably, the procedure followed in this manufacture is that (a)(a') 2 mols of a compound of formula (15) are monomethylolated with 2 mols of formaldehyde or of a formaldehyde-releasing agent, subsequently reacted with (b') 1 mol of a compound of formula (16), in the absence of water, in an inert organic solvent, at elevated temperature, and the resulting product thereafter (b) methylolated with 2 to 3 mols of formaldehyde or of a formaldehyde-releasing agent and subsequently optionally further etherified with (c) 1 to 3 mols of an alkanol with at most four carbon atoms.

At the same time it is also possible to manufacture the phosphorus compounds of formulae (1) to (14) according to a different process, by first (a)(b') monomethylolating 1 mol of a compound of formula (16) with formaldehyde or a formaldehyde-releasing agent at each of the two $H_2N$ groups, and subsequently (a') reacting with 2 mols of a compound of formula (15) in the absence of water, in an inert organic solvent, at elevated temperature, and thereafter reacting with components (b) and optionally (c) as previously indicated.

Schematically the two reaction routes, of which the first route is preferred, can for example be represented as follows:

Route 1

(a)(a')   —CO—NH$_2$ + CH$_2$O     CH$_2$O + H$_2$N—CO—...

↓

....—CO—NH—CH$_2$OH     HOCH$_2$—HN—CO—...

optionally etherify

+

(b')                H$_2$N—A—NH$_2$

↓

...—CO—NH—CH$_2$—HN—A—NH—CH$_2$—HN—CO...

↓

(b)

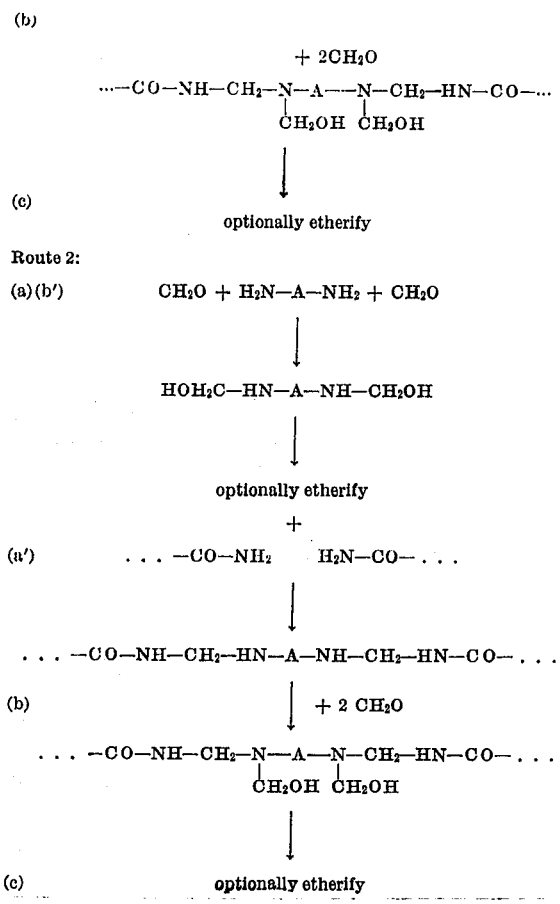

Route 2:

Furthermore, the compounds of formulae (15) and (16) together with formaldehyde can also be reacted with one another in the so-called "single-pot process", that is to say simultaneously.

Where appropriate, the methylol compound, or its ether, of the component (a') or of the component (b') can also be reacted with the component (b') or the component (a'), respectively, in the presence of an acid catalyst such as for example sulphuric acid, phosphoric acid or preferably p-toluenesulphonic acid. In this reaction the resulting water is appropriately distilled off azeotropically. As a rule the reaction is allowed to take place at the boil of the organic solvent used, for example benzene, toluene or xylene, that is to say preferably at temperatures of 60° to 150° C.

The methylolations with formaldehyde or a formaldehyde-releasing agent, preferably paraformaldehyde, are carried out according to known methods, preferably in the presence of a basic catalyst, such as strong bases, for example sodium hydroxide, potassium hydroxide, sodium methoxide or sodium ethoxide, or weak bases, for example sodium acetate, magnesium carbonate or especially magnesium hydroxide, and at temper-atures of up to 150° C., preferably of 50° to 100° C. The methylolation of the condensation product (a) can be carried out in the presence of the organic solvent or only after its removal and can also be carried out with aqueous formaldehyde. The methylolation can however also be carried out in the acid medium.

The amount of the methylol compound formed can be determined by determining the formaldehyde bonded as —CH$_2$OH. As a rule the yields of methylol compound are about 70 percent calculated as dimethylol compound.

Compounds of formula (1) wherein Y represents an alkyl residue with at most 4 carbon atoms are obtained by etherification of the methylol compound with a monohydric aliphatic alcohol which contains at most four carbon atoms, preferably methanol in the presence of an acid.

Phosphonocarboxylic acid amides of formula

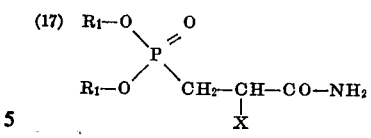

wherein $R_1$ and X have the indicated significance, are preferably used for the manufacture of the compounds of formulae (1) to (14).

Phosphonocarboxylic acid amides of formula

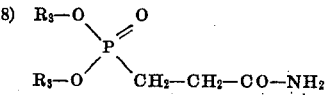

wherein $R_3$ denotes an ethyl or preferably methyl residue, such as for example 3(-dimethylphosphono)-propionic acid amide, are of particular interest.

Preferred components (b') for the manufacture of the compounds of formulae (1) to (10) are those of formula

(19) H$_2$N—A'$_2$—NH$_2$ wherein $A_2$ denotes a residue of formula —CO—, —CS—, —CNH— or —CO—NH—CO—. The compounds of formula (19) are thus thiourea or preferably urea, or furthermore guanidine or biuret. The compounds of formula (16) can furthermore also be sulphamide.

The invention also relates to a process for the flameproofing and creaseproofing of cellulose-containing fiber materials, characterized in that an aqueous preparation which contains at least one phosphorus compound of one of formulae (1) to (10) and optionally a curable aminoplastic precondensate is applied to these materials, and that the materials are thereafter dried and subjected to a treatment at elevated temperature.

In particular, the phosphorus compounds of formula (1) are used for the flameproofing and creaseproofing of cellulose-containing textile material. Phosphorus compounds of formulae (2) to (4), and above all (5) to (9), are preferred, and the process for flameproofing and creaseproofing is of very particular interest if the compound of formula (10) is used. Phosphorus compounds of formula (11) to (13) and especially of formula (14) are also suitable for the flameproofing of cellulose-containing fiber material, especially textiles.

The pH-value of the aqueous preparations containing the compounds of formula (1) is advantageously less than 5, especially less than 3. In order to achieve this, strong mineral acids such as sulphuric acid, nitric acid, hydrochloric acid or preferably orthophosphoric acid are added to the preparations. Instead of the acids themselves, especially hydrochloric acid, it is also possible to use compounds from which the corresponding acids are easily, for example even without warming, formed in water by hydrolysis. As examples, phosphorus trichloride, phosphorus pentachloride, phosphorus oxychloride, thionyl chloride, sulphuryl chloride, cyanuryl chloride, acetyl chloride and chloracetyl chloride may here be mentioned. On hydrolysis, these compounds exclusively yield acid decomposition products, for example cyanuric acid and hydrochloric acid. Now it can be advantageous to employ, instead of one of the strong acids mentioned, the acid mixtures corresponding to the hydrolysis products of one of the compounds just mentioned, that is to say for example to employ a mixture of hydrochloric acid and orthophosphoric acid, appropriately in a molecular ratio of 5:1, corresponding to phosphorus pentachloride instead of using hydrochloric acid alone.

Preferably, the preparations for flameproofing and creaseproofing also contain a latent acid catalyst for accelerating the cure of the aminoplast precondensate which is optionally present and for crosslinking the compounds of formula (1). The catalysts known for curing aminoplast on cellulose-containing material, for example ammonium dihydrogen orthophosphate, magnesium chloride, zinc nitrate and above all ammonium chloride, can be used as latent, acid catalysts.

The preparations to be used according to the invention can contain yet further substances apart from the compounds of formula (1) and the additives required for adjusting the pH-value and/or the cure catalysts. An addition of aminoplast precondensates is particularly advantageous for achieving a good wash-resistant flameproof finish.

By aminoplastic precondensates there are understood addition products of formaldehyde to nitrogen compounds which can be methylolated. 1,3,5-Aminotriazines, such as N-substituted melamines, for example N-butylmelamine, N-trihalogenomethylmelamines, as well as ammeline, guanamines, for example benzoguanamine, acetoguanamine or also diguanamines may be mentioned. Further possibilities are also: alkylureas or arylureas and alkylthioureas and arylthioureas, alkyleneureas or alkylenediureas, for example ethyleneurea, propyleneurea or acetylenediurea, or especially 4,5-dihydroxyimidazolidone-2 and derivatives thereof, for example the 4,5-dihydroxyimidazolidone-2 which is substituted by the residue —$CH_2CH_2CO$—NH—$CH_2OH$ at the hydroxyl group in the 4-position. The methylol compounds of a urea, of an ethyleneurea or of melamine are preferentially used. Products which are as highly methylolated as possible in general yield particularly valuable products. Suitable aminoplast precondensates are both predominantly monomolecular aminoplasts and also more highly precondensed aminoplastics.

The ethers of these aminoplast precondensates can also be used together with the compounds of formula (1). The ethers of alkanols such as methanol, ethanol, n-propanol, isopropanol, n-butanol or pentanols are for example advantageous. It is however desirable for these aminoplast precondensates to be water-soluble, such as for example pentamethylolmelaminedimethyl ether.

It can also be of advantage if the preparations contain a copolymer obtained by polymerization in aqueous emulsion from (a) 0.25 to 10 percent of an alkaline earth salt of an $\alpha, \beta$-ethylenically unsaturated monocarboxylic acid, (b) 0.25 to 30 percent of a N-methylolamide or N-methylolamide-ether of an $\alpha, \beta$-ethylenically unsaturated monocarboxylic or dicarboxylic acid and (c) 99.5 to 60 percent of at least one other copolymerizable compound. These copolymers and their manufacture are also known. The tear strength and abrasion resistance of the treated fiber material can be favorably influenced by the conjoint use of such a copolymer.

A plasticizing finishing agent, for example an aqueous polyethylene emulsion or ethylene copolymer emulsion, should be mentioned as a further additive which is advantageous in some cases.

The preparations can furthermore also contain solubilizing agents, such as organic solvents miscible with water, for example ethanol or methanol.

The content of the compound of formula (1) in the aqueous preparation is appropriately so chosen that 15 to 40 percent are applied to the material to be treated. Here it is necessary to bear in mind that the commercially available textile materials of natural or regenerated cellulose can absorb between 50 and 120 percent of an aqueous preparation. As a rule the aqueous preparations contain 200 to 700 g/l, preferably 300 to 500 g/l, of phosphorus compound of formula (1).

The amount of the additive required to adjust the hydrogen ion concentration to a value of less than 5 depends on the selected value itself and on the nature of the additive, but cannot be less than a certain minimum. A certain excess over this minimum amount is generally advisable. Large excesses do not offer any advantages and can even prove harmful.

If a polymer of the indicated nature is furthermore added to the preparation, then this is advantageously done in small amounts, for example 1 to 10 percent, relative to the amount of the compound of formula (1). The same is true of any plasticizer, where the appropriate amount can again be 1 to 10 percent.

The preparations are now applied to the cellulose-containing fiber materials, for example linen, cotton, rayon, viscose staple or fiber mixtures of such materials and others, such as wool, polyamide or polyester fibers and this can be done in a manner which is in itself known. Preferably, piece goods are used and are impregnated on a padder of the usual construction, which is supplied with the preparation at room temperature.

The fiber material impregnated in this way now has to be dried and this is appropriately done at temperatures of up to 100° C. Thereafter it is subjected to a dry heat treatment at temperature above 100° C, for example between 130° and 200° C., and preferably between 140° and 170° C., the duration of which can be the shorter, the higher is the temperature. This duration of heating is for example 2 to 6 minutes at temperatures of 140° to 170° C. Since the methylol residues or methylol-ether residues in the compounds of formula (1) are decomposed during this process, water or an alcohol are thereby produced. Now it has been found that these volatile decomposition products must be continuously removed from the material in order that the desired effect can manifest itself to the full extent. The equipments in which the heat treatment is carried out have to be chosen accordingly. Those apparatuses in which fresh air is continuously supplied and the air laden with the resulting volatile substances is continuously removed, whilst maintaining the prescribed temperature, are very suitable. Such equipments, for example so-called turbofixers or jet fixers, are known.

A post-wash with an acid-binding agent, preferably with aqueous sodium carbonate solution, for example at 40° C. up to the boil and for 3 to 10 minutes, is desirable in the case of a strongly acid reaction medium.

As already indicated, flameproof and creaseproof finishes can be obtained according to the present process which remain largely preserved even after repeated washing or drycleaning and which do not cause any unacceptable lowering of the mechanical textile properties of the treated material.

A particular advantage of the present process is the fact that the treated cellulose-containing fiber materials are simultaneously flameproof and creaseproof. In particular, the wet creasing properties of the treated fiber materials are considerably improved together with the flameproof finish. A distinct improvement of the dry creasing angle can also be observed.

The percentages and parts in the examples which follow are units by weight unless otherwise stated. The relationship of parts by volume to parts by weight is as of ml to g.

EXAMPLE 1

1.1 880 parts ($\approx$ 4 mols) of 96 percent strength 3-[dimethylphosphono]-methylolpropionic acid amide manufactured in the usual manner by methylolation of 3-[dimethylphosphono]e-propionic acid amide and 120 parts (mols) of urea in 800 parts of benzene are brought to the boil under reflux, with rapid stirring, in a 2,500 parts by volume stirred flask equipped with a water separator and thermometer. Over the course of 18 hours, a total of 65 parts of water of condensation are formed in this manner and collected in the water separator. After this time no further water is formed. The benzene is distilled off as extensively as possible and the residue is cooled to room temperature.

1.2 261 parts ($\approx\frac{1}{2}$ mol) of the reaction product 1.1 ($\approx$223 parts of 100 percent strength) are dissolved in 150 parts of aqueous 40 percent strength formaldehyde in a 500 parts by volume stirred flask equipped with a condenser and pH electrode, and warmed to 60° C. The mixture is allowed to react for 5 hours at pH 8.5 to 9 with the gradual addition of 6.6 parts of 30 percent strength sodium hydroxide solution, and the residual benzene is removed in vacuo, after which the mixture is cooled. 285 parts of a viscous, milky-white and water-miscible product of formula (10) are obtained, having a solids content of 90 percent. The formaldehyde determination yields the following values: $CH_2O$, total = 64.4 g; $CH_2O$, free = 32.6 g; $CH_2O$, bonded = 31.8 g.

EXAMPLE 2

211 parts of 3(dimethylphosphono)-methylolpropionic acid amide (1 mol), 48 parts of sulphamide (0.5 mol) and 2.6 parts of p-toluenesulphonic acid monohydrate are suspended in 250 parts of benzene in a stirred flask of 500 parts by volume capacity, equipped with a water separator and thermometer, and are warmed to the reflux temperature whilst stirring. The reaction is complete after 20 hours. 20 parts of water of condensation are obtained. Thereafter the benzene is removed in vacuo. 242 parts of a syrupy reaction product remain, which still contains 1.8 parts of free formaldehyde and 5.2 parts of total formaldehyde.

73.5 parts of aqueous 40.8% strength formaldehyde (1 mol) are added to this reaction product and methylolation is carried out for 6½ hours at 60° C. The pH is kept at 8 to 9 by means of 30 percent strength aqueous sodium hydroxide solution. After this time the content of free formaldehyde remains constant and is still 10.8 parts, corresponding to 70 percent formation of the dimethylol compound of formula (14). The product is freed of small proportions of more highly condensed water-insoluble constituents by filtration and has an active substance content of 76.5 percent. A clear aqueous-methanolic solution is produced by adding methanol.

EXAMPLE 3

211 parts (1 mol) of 3-[dimethylphosphono]-methylolpropionic acid amide, 63 parts of 97 percent strength guanidine nitrate and 1.4 parts of p-toluenesulphonic acid monohydrate are suspended in 200 parts of toluene, in a stirred vessel of capacity 500 parts by volume and equipped with a thermometer, reflux condenser and water separator, and are condensed at the reflux temperature of the toluene. The resulting water is removed azeotropically and collected in the water separator. After 4 hours the reaction is complete and the theoretical amount of water (18.5 parts) is obtained. Thereafter the mixture is cooled to 100° C., 61.5 parts (2 mols) of 97.5 percent strength paraformaldehyde and 5 parts of sodium methylate powder are added, and methylolation is carried out for 2 hours at 100° C. Thereafter the mixture is cooled, diluted with 200 parts of methanol, and freed of small amounts of insoluble constituents by filtration, whereupon the methanol and toluene are removed in vacuo at 50° C. 285 parts of a yellowish, water-soluble, syrupy product are obtained which shows an active substance content of practically 100 percent and which, on the basis of the formaldehyde value found, corresponds to the following formula:

(20)

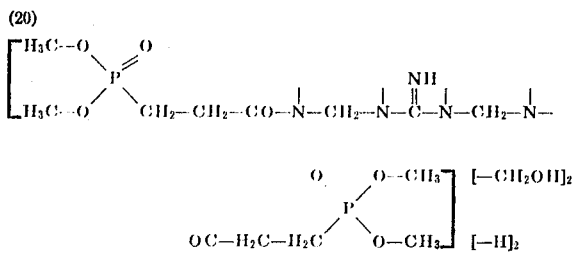

EXAMPLE 4

211 parts (1 mol) of 3-[dimethylphosphono]-methylolpropionic amide, 51.5 parts (0.5 mol) or biuret and 1.4 parts of p-toluenesulphonic acid monohydrate are suspended in 200 parts of toluene in the apparatus described in Example 3, and are condensed according to Example 3. After 4½ hours the reaction is complete. 19 parts of water are obtained. After adding 76.8 parts (2.5 mols) of 97.5 percent strength paraformaldehyde and 5 parts of sodium methylate powder, the methylolation is carried out in an analogous manner to that indicated in Example 3.

276 parts of a viscous, water-soluble, yellowish product are obtained which shows practically 100 percent active substance content and which, on the basis of the formaldehyde content determined, corresponds to the following formula:

(21)

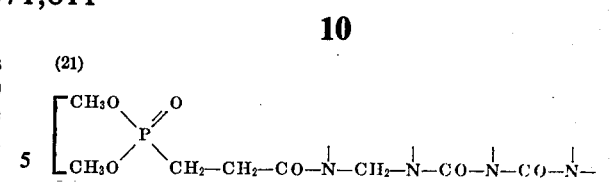

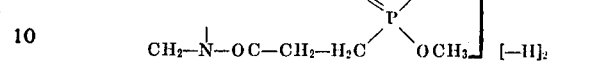

EXAMPLE 5

The procedure of Example 3 is followed, but the guanidine nitrate is replaced by 38.0 parts (0.5 mol) of thiourea, and 16.5 parts of water of condensation are obtained.

On the basis of the formaldehyde content determined, the water-soluble reaction product corresponds to the formula:

(22)

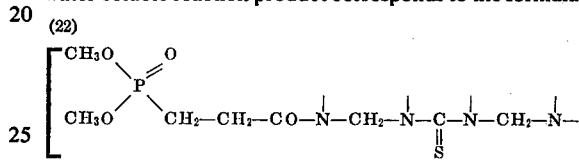

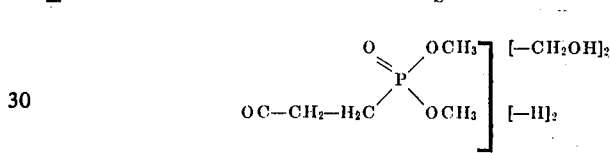

EXAMPLE 6

139 parts (0.5 mol) of 3[bis-2-chlorethylphosphono]-propionic acid amide, 15 parts (0.25 mol) of urea, 15.4 parts (0.5 mol) of 97.5 percent strength paraformaldehyde and 2 parts of sodium methylate powder in 200 parts of toluene are warmed to 100° C. internal temperature in the apparatus described in Example 3, and methylolated for 1 hour. Thereafter the mixture is raised to the boiling point of the toluene and the water produced during the condensation is removed azeotropically and collected in the water separator. The theoretical amount of 9 parts of water is obtained over the course of 14 hours. After this time the reaction is complete and no further water is obtained.

Thereafter the mixture is cooled to 100° C., a further 30.8 parts (1 mol) of 97.5 percent strength paraformaldehyde and a further 3 parts of sodium methylate powder are added, and methylolation is carried out for 2 hours at 100° C. Thereafter the mixture is cooled, diluted with 200 parts of methanol, and freed of a little insoluble constituents by filtering. Finally, the methanol and toluene are removed in vacuo. A very highly viscous, 100 percent strength, opalescent product is obtained, which is soluble in a methanol-water mixture and which on the basis of the formaldehyde content determined corresponds to the following formula:

(23)

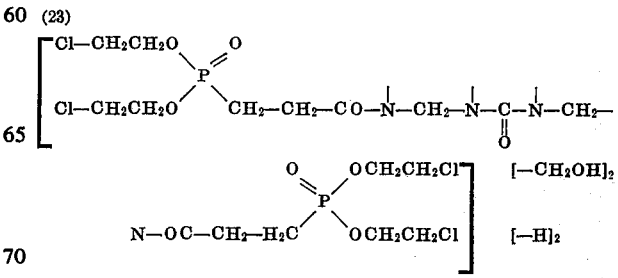

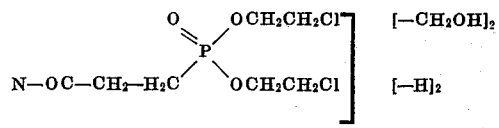

EXAMPLE 7

The procedure described in Example 6 is followed but the bis-(2-chlorethylphosphono)-propionic acid amide is replaced 4½ minutes at 160° C. The fabric is now post-washed at the boil for 5 minutes in a solution which per liter of water contains 2 g of anhydrous sodium carbonate, rinsed and dried. A part of the fabric is boiled 5 times for 30 minutes in a solution which contains 2 g of sodium carbonate and 5 g of soap per liter of water (= 5 SNV-4 washes).

The individual pieces of fabric are then tested for their flameproof property and crease resistance (vertical test according to DIN 53,906). The results of these tests are also summarized in Tables I and II:

TABLE I

| Constituents | Un-treated | Treated with preparation— | | | |
|---|---|---|---|---|---|
| | | A | B | C | D |
| Product according to Example 1 (76% strength) g./l. | | 585 | 585 | 585 | 585 |
| Polyethylene emulsion (20% strength) ml./l. | | | 20 | | 20 |
| Condensation product of 1 mol of p.tert.nonylphenol with 9 mols of ethylene oxide (100% strength) g./l. | | 1 | 1 | 1 | 1 |
| Pentamethylolmelamine-dimethyl ether (60% strength) g./l. | | 80 | 80 | | |
| NH$_4$Cl, g./l. | | 4 | 4 | 4 | 4 |
| Flameproof property: | | | | | |
| After post-wash: | | | | | |
| Burning time (sec.) | Burns | 0 | 0 | 0 | 0 |
| Tear length (cm.) | | 9.5 | 8.5 | 9.5 | 10.5 |
| Plus after 5 SNV-washes: | | | | | |
| Burning time (sec.) | Burns | 0 | 0 | Burns | Burns |
| Tear length (cm.) | | 10.5 | 10.5 | | |
| Crease resistance, creasing angle (mean of 10 tests): | | | | | |
| Dry (≮°) | | 69 | | 101 | |
| Wet (≮°) | | 57 | | 117 | |
| Handle* | | 3 | 4 | 3 | 3 | 1 |

*Rating 1 soft; rating 8 stiff.

TABLE II

| Constituents of the preparation E | Amount in g/l |
|---|---|
| Product according to Example 2 (76.5% strength) | 500 |
| Methanol | 160 |
| Water | 290 |
| NH$_4$Cl | 50 |
| pH of the preparation [adjusted with H$_3$PO$_4$ (85% strength)] | 4 |
| Flameproof property unwashed: burning time (sec.) | 0 |
| tear length (cm) | 0 |
| + after post-wash: burning time (sec.) | 0 |
| tear length (cm) | 10.5 |
| + after 5 SNV-4 washes: burning time (sec.) | 0 |
| tear length (cm) | 11.0 |

EXAMPLE 13

A cotton fabric or a viscose rayon fabric or a polyester-cotton fabric is padded with one of the aqueous liquors F to H of Table III below. The phosphorus content of all preparations is adjusted to 41 g/l. The liquor uptake is 80 percent or 85 percent or 90 percent respectively. The material is dried at 70° to 80° C. and thereafter cured for 5 minutes at 145° C. A part of the fabric is now post-washed at the boil (cotton) or at 60° C. (viscose rayon and polyester-cotton) in a solution containing 2 g of anhydrous sodium carbonate per liter of water, rinsed and dried. A further part of this fabric is now boiled, or washed at 60° C., 5 times for 30 minutes in a solution which contains 2 g of anhydrous sodium carbonate and 5 g of soap per liter of water (= 5 SNV-4 washes or SNV-3 washes, respectively).

The individual pieces of fabric are then tested for their flameproof property (vertical test according to DIN 53,906). The results of this test are also summarized in table III.

TABLE III

| Constituents | Un-treated | Treated with preparation— | | |
|---|---|---|---|---|
| | | F | G | H |
| Product according to Example: | | | | |
| 6, g./l. | | 445 | | |
| 7, g./l. | | | 490 | |
| 9, g./l. | | | | 375 |
| Pentamethylolmelamine-dimethyl ether (60% strength) | | 80 | 80 | 80 |
| H$_3$PO$_4$ (85% strength) g./l. | | 30 | 30 | 30 |
| pH of the preparation | | 2.7 | 3.0 | 2.4 |
| Flameproof property: | | | | |
| Cotton fabric: | | | | |
| After post-wash: | | | | |
| Burning time (sec.) | Burns | 0 | 2 | 0 |
| Tear length (cm.) | | 10 | 10.5 | 10 |
| Plus after 5 SNV-4 washes: | Burns | | | |
| Burning time (sec.) | | 0 | 2 | 0 |
| Tear length (cm.) | | 10 | 12 | 10 |
| Viscose rayon fabric: | | | | |
| After post-wash: | | | | |
| Burning time (sec.) | Burns | 0 | | 1 |
| Tear length (cm.) | | 10 | | 10.5 |
| Plus after 5 SNV-3 washes: | | | | |
| Burning time (sec.) | | 0 | | 1 |
| Tear length (cm.) | Burns | 9 | | 11 |
| Polyester-cotton fabric: | | | | |
| After post-wash: | | | | |
| Burning time (sec.) | do | 0 | | 0 |
| Tear length (cm.) | | 14 | | 14.5 |

EXAMPLE 14

A cotton fabric is padded with one of the aqueous liquors I to L of Table IV below. The liquor uptake is 80 percent. The material is dried at 70° to 80° C. and thereafter cured for 5 minutes at 145° C. The fabric is now post-washed at the boil for 5 minutes in a solution which contains 2 g of anhydrous sodium carbonate per liter of water, rinsed and dried.

The individual pieces of fabric are then tested for their flameproof property (vertical test according to DIN 53,906). The results of this test are summarized in Table IV.

TABLE IV

| Constituents | Un-treated | Treated with preparation— | | | |
|---|---|---|---|---|---|
| | | I | J | K | L |
| Product according to Example: | | | | | |
| 3, g./l. | | 415 | | | |
| 4, g./l. | | | 400 | | |
| 6, g./l. | | | | 510 | |
| 9, g./l. | | | | | 375 |
| Pentamethylolmelamine-dimethyl ether (60% strength) g./l. | | 80 | 80 | 80 | 80 |
| H$_3$PO$_4$ (85% strength) g./l. | | 30 | 30 | 30 | 30 |
| pH of the preparation | | 2.1 | 2.5 | 1.8 | 2.7 |
| Flamproof property: | | | | | |
| After post-wash: | | | | | |
| Burning time (sec.) | Burns | 0 | 0 | 0 | 0 |
| Tear length (cm.) | | 10 | 10.5 | 12 | 10 |

EXAMPLE 15

445 parts of the product according to Example 7 are mixed with 30 parts of 85 percent strength phosphoric acid and made up to 1,000 parts by volume with water. A cotton fabric is padded in this solution, dried at 80° C. and cured for 4½ minutes at 160° C. Thereafter the fabric is post-washed for 5 minutes at the boil in a solution of 2 parts of sodium carbonate in 1,000 parts of water. After this post-wash the deposit of flame-proofing agent on the fabric is 18 percent.

The fabric possesses very good flameproof properties, which remain preserved even after 3 SNV-4 washes at the boil.

EXAMPLE 16

A cotton fabric is padded with one of the aqueous liquors M an N of Table V below. The liquor uptake is 80 percent. The material is dried at 70° to 80° C. and thereafter cured for 5 minutes at 145° C.

The two pieces of fabric show good flameproof properties when tested according to the vertical test DIN 53,906.

TABLE V

| Constituents | | treated with preparation | |
|---|---|---|---|
| | | M | N |
| Product according to Example 5, | g/l | 355 | |
| Product according to Example 11, | g/l | | 620 |
| Pentamethylolmelamine-dimethyl ether (60% strength) | g/l | 80 | 80 |
| H₃PO₄ (85% strength) | g/l | 30 | 30 |
| pH of the preparation | | 2.3 | 1.8 |

We claim:

1. A phosphorus compound of the formula

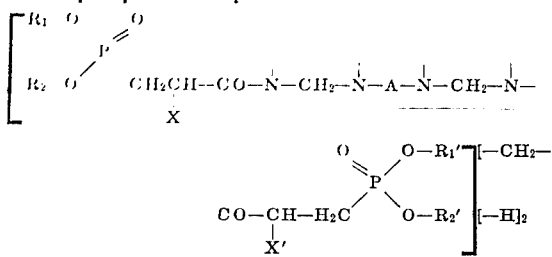

in which $R_1$, $R_2$, $R_1'$ and $R_2'$ each is an alkyl, alkenyl or halogen-alkyl radical with at most four carbon atoms, X and X' each is a methyl group or a hydrogen atoms, A is a radical of the formula —CO—, —CS—, —SO₂— or —CO—NE—CO—, in which E is a hydrogen atom or a Y—CH₂—O— radical and wherein Y is an alkyl radical with at most four carbon atoms or a hydrogen atom.

2. A phosphorus compound according to claim 1, wherein $R_1$, $R_2$, $R_1'$ and $R_2'$ are identical and X and X' are identical.

3. A phosphorus compound according to claim 1, wherein $R_1$, $R_2$, $R_1'$ and $R_2'$ are identical and X and X' are identical and A is a —CO—, —CS— or —SO₂— radical.

4. A phosphorus compound according to claim 1, wherein $R_1$, $R_2$, $R_1'$ and $R_2'$ are identical and are methyl or ethyl radicals, A is a —CO—, —CS— or —SO₂— radical, Y is a methyl group or a hydrogen atom and X and X' are hydrogen.

5. A phosphorus compound according to claim 1, wherein A is a —CO—, —CS—, —CNH— or —CO—NE—CO— radical.

6. A phosphorus compound according to claim 5, wherein $R_1$, $R_2$, $R_1'$ and $R_2'$ are identical and X and X' are identical.

7. A phosphorus compound according to claim 1, wherein $R_1$, $R_2$, $R_1'$ and $R_2'$ are identical and X and X' are identical and A is a —CO— or —CS— radical.

8. A phosphorus compound according to claim 4, wherein A is a —CO— or —CS— radical.

9. A phosphorus compound according to claim 4, wherein A is a —CO— radical.

10. A phosphorus compound according to claim 1, wherein A is a —SO₂— radical.

11. A phosphorus compound according to claim 10, wherein $R_1$, $R_2$, $R_1'$ and $R_2'$ are identical and X and X' are identical.

12. A phosphorus compound according to claim 4, wherein A is a —SO₂— radical.

13. A phosphorus compound according to claim 1 of the formula

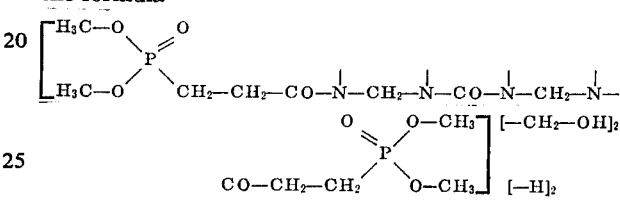

14. A phosphorous compound according to claim 1 of the formula

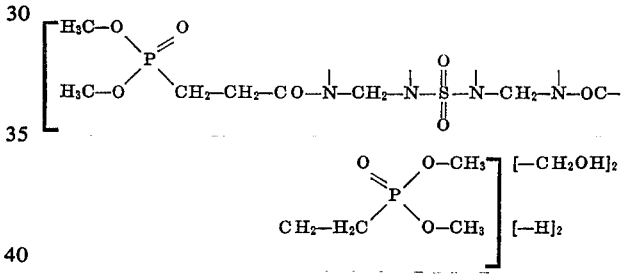

* * * * *

PO-1050
(5/69)

UNITED STATES PATENT OFFICE
CERTIFICATE OF CORRECTION

Patent No. 3,671,611      Dated June 20, 1972

Inventor(s) HERMANN NACHBUR & ARTHUR MAEDER

It is certified that error appears in the above-identified patent and that said Letters Patent are hereby corrected as shown below:

Cover page, after "[73] Assignee:" delete "Ciba Limited" and insert --- CIBA-GEIGY AG, Basel, Switzerland ---.

Column 15, claim 1, line 14, amend the left side of the structural formula to read:

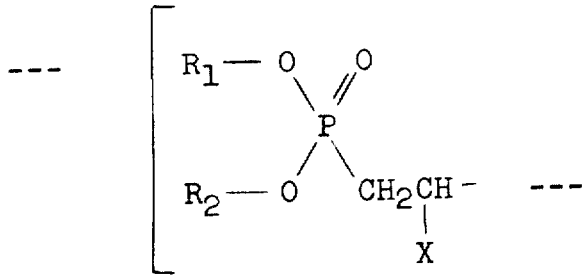

Signed and sealed this 16th day of April 1974.

(SEAL)
Attest:

EDWARD M.FLETCHER,JR.
Attesting Officer

C. MARSHALL DANN
Commissioner of Patents